United States Patent [19]
Limberger, deceased et al.

[11] 3,933,349
[45] Jan. 20, 1976

[54] DOCUMENT COPYING MACHINE

[75] Inventors: Walter Limberger, deceased, late of Hamburg-Poppenbuttel, Germany; by Jurgen Limberger, heir, Hamburg-Poppenbuttel, Germany; by Ursula Limberger, heir, Hamburg-Poppenbuttel, Germany; Francois Prick van Wely, Travenberg, Germany; Uwe Winzentsen, Hamburg, Germany

[73] Assignee: Lumoprint Zindler KG, Germany

[22] Filed: Mar. 7, 1974

[21] Appl. No.: 449,021

Related U.S. Application Data

[62] Division of Ser. No. 351,288, April 16, 1973.

[30] Foreign Application Priority Data

Apr. 20, 1972   Germany............................ 2219307

[52] U.S. Cl................................. 271/10; 271/127
[51] Int. Cl.[2]......................................... B65H 7/18
[58] Field of Search......... 271/9, 10, 126, 127, 145, 271/147, 160; 355/50, 51

[56] References Cited
UNITED STATES PATENTS

| | | | |
|---|---|---|---|
| 3,469,834 | 9/1969 | Stange et al. | 271/10 |
| 3,528,739 | 9/1970 | Noda | 271/172 X |
| 3,565,420 | 2/1971 | Howard | 271/163 X |
| 3,640,524 | 2/1972 | Fredrickson | 271/121 |
| 3,697,165 | 10/1972 | Morriston et al. | 355/50 X |
| 3,756,586 | 9/1973 | Craft | 271/117 X |

FOREIGN PATENTS OR APPLICATIONS

| | | | |
|---|---|---|---|
| 136,546 | 9/1947 | Australia | 355/50 |

*Primary Examiner*—Evon C. Blunk
*Assistant Examiner*—Robert Saifer
*Attorney, Agent, or Firm*—Toren, McGeady and Stanger

[57] ABSTRACT

A copying machine for producing one or more copy sheets from a document original has a carriage for the original which is driven by an endless circulating chain. The carriage is uncoupled from the chain at each end of its reciprocating stroke and the further movement of the chain then actuates other control functions while the carriage is stationary and uncoupled. Only one driving motor is therefore needed in the machine. The copy sheet guide path is defined in relation to the movement of the carriage so that a copy sheet traverses the whole guide path during one reciprocating stroke of the carriage. The copy sheets are held in a cassette-type stack holder which is inserted vertically and which forms an extension of a vertical leg of the copy sheet guide path.

6 Claims, 15 Drawing Figures

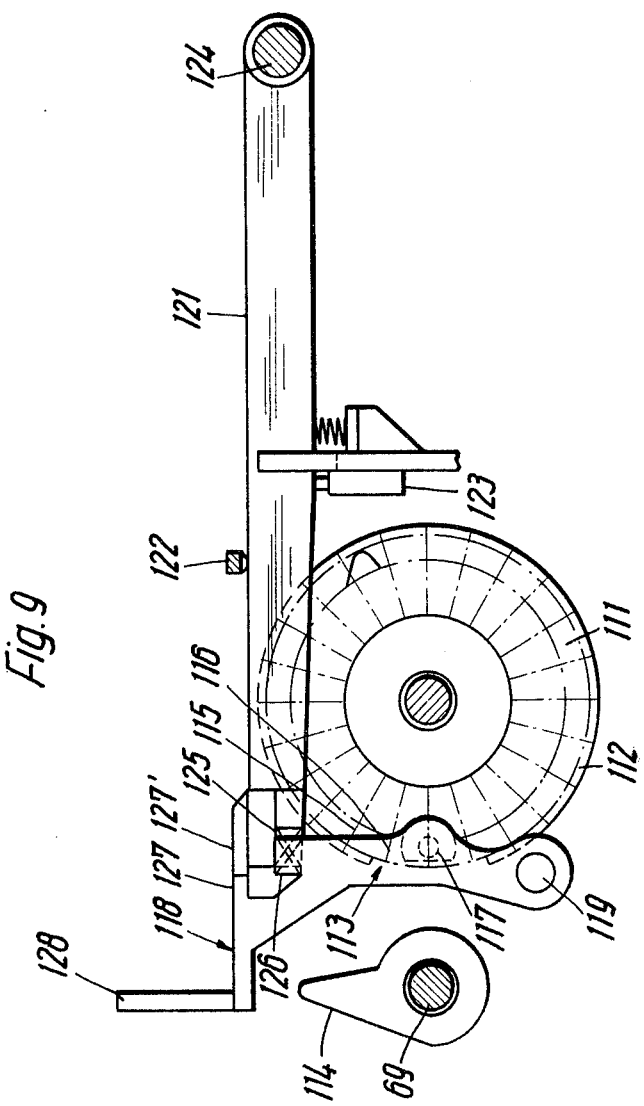

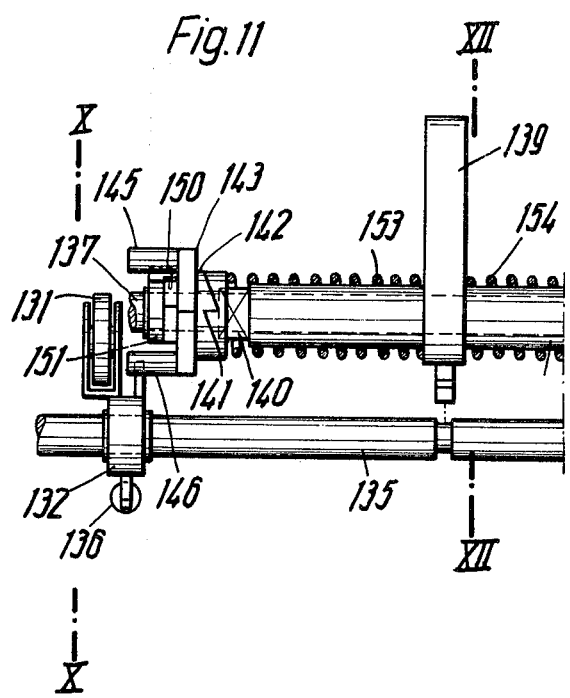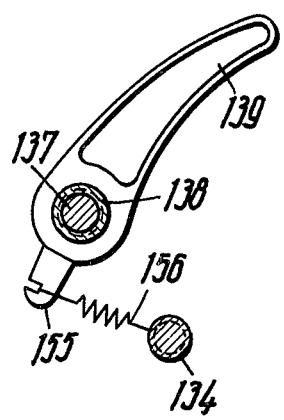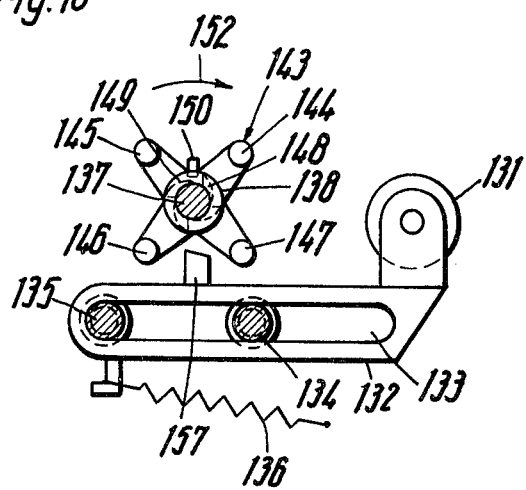

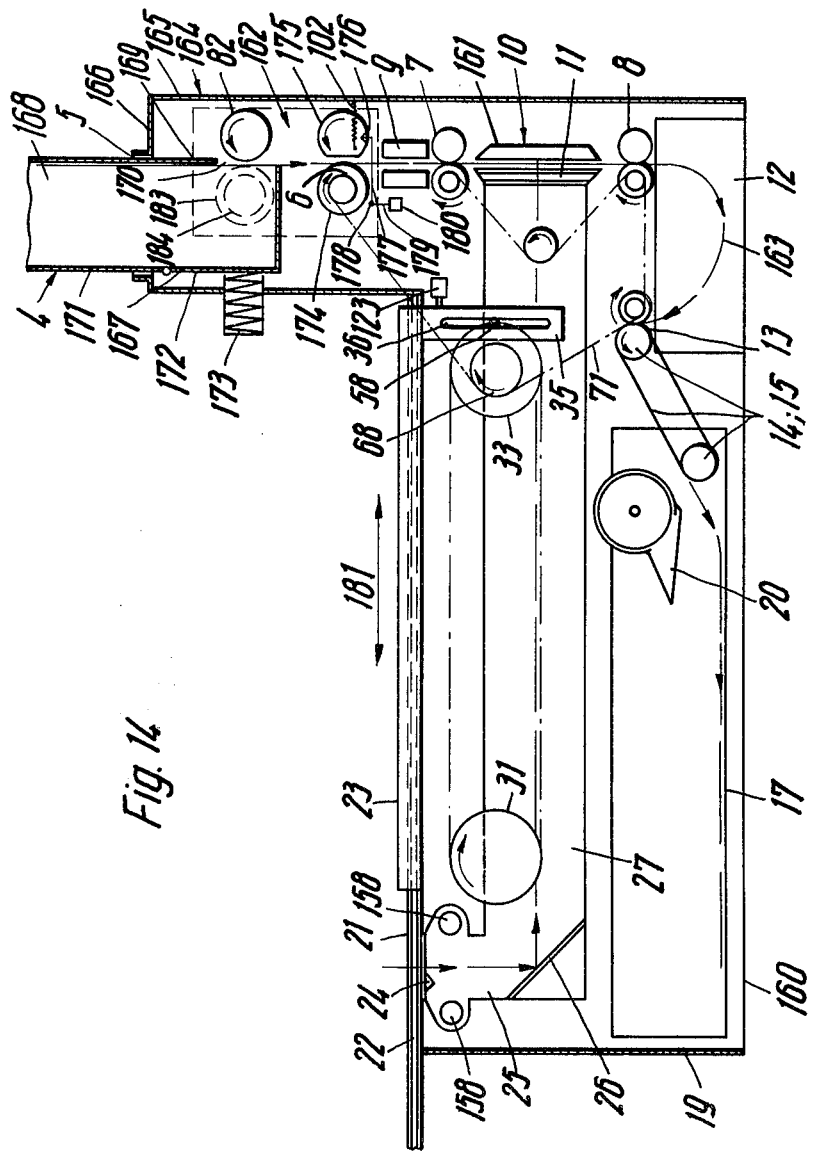

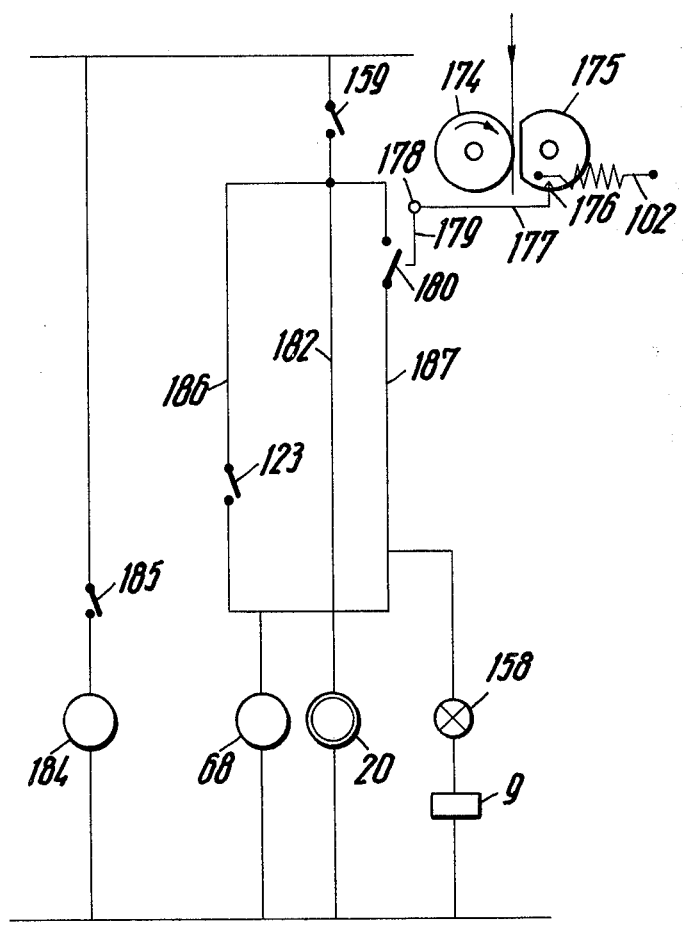

DOCUMENT COPYING MACHINE

This is a division of application Ser. No. 351,288 filed Apr. 16, 1973.

FIELD OF THE INVENTION

This invention relates to copying machines for producing a copy or copies from an original which is laid on a reciprocably movable carriage which is driven by a chain drive having a circulating chain.

Furthermore, the present invention is concerned more particularly with copying machines of this type which incorporate a holder for a stack of sheet-form copy material, a document scanning mechanism which includes a scanning aperture in the path of movement of the carriage and an exposure aperture in the path of the copy sheet material, a copy sheet charging device, a developing device for the exposed copy sheets, and a drying device, and wherein drive means are provided for the carriage and for the sheet-form copy material.

DESCRIPTION OF THE PRIOR ART

Known copying machines of this latter type in general have two drive circuits, one of which is provided for the reciprocating carriage and the other of which is provided for transport means for the copy sheet material. Because of this, either a number of motors must be used or else complicated coupling arrangements must be provided in order to be able to drive the moving parts, such as the carriage, discontinuously in different changing directions. In such known copying machines the inclusion of a multiple copy mechanism is expensive because, for each setting of a desired number of copies, a continuous reciprocating movement of the carriage is necessary. The known coupling means are not only complicated but they also raise the problem of ensuring that the original to be copied and its carriage on the one hand and the copy sheet material on the other hand are brought in exact spatial and timed synchronization to their respective correct positions at the scanning and exposure apertures respectively. Any play in the coupling components impairs the necessary synchronization.

It is known to bring sheet-form copy material into a ready position in front of the entry to the copy sheet guide path in which the ready position is accurately defined by stops or abutments. The use of such a ready position is aimed to make ineffective any differences or deviations which may arise in the withdrawal of the individual copy sheets from the stack. However, for this purpose the known copying machines require bulky control means, particularly alternately driven and stationary rollers or pairs of rollers, with the result that not only are many additional components necessary which must be controlled and coupled together, but also there is increased initial expense and increased likelihood of faults arising. It is also to be noted that in order to set stationary transport means into rotation moments of inertia must be overcome which load the coupling means and can also lead to inaccuracies.

In certain known copying machines the copy sheet stack holder is arranged horizontally. In such cases it is known to insert a stack of copy sheets directly into a stack holder which is provided with counterpressure means with a withdrawal roller acting on the uppermost sheet of the stack, or alternatively to provide a cassette which can be fitted into the stack holder.

Such a form of stack holder necessitates a considerable cost outlay. The manual operations involved in manually loading a stack of copy sheets directly into a holder is comparatively complicated. The use of a box-type insertable cassette increases the basic cost for the machine installation since free space must be left around the machine, in general in the longitudinal direction of the machine, which is longer than the maximum theoretical length of copy sheet material which can be handled.

Upon the insertion of a cassette there is furthermore the problem that the stack of sheets, upon the insertion of the cassette, is not displaced in the region of the leading edges of the sheets as is necessary to bring them to the withdrawal roller, although with inserted cassettes counterpressure means are used to act on the rear wall of the cassette which at this position is either open or flexible, the counterpressure means pressing the leading edges of the copy sheets towards the withdrawal roller.

SUMMARY OF THE INVENTION

It is an object of the present invention to provide a copying machine of the type first mentioned above for the production of copies, which has an improved control system in comparison with the known machines, which has high accuracy in spite of having less complicated coupling means than the known machines, and which is also of a construction which as a result of the use of a reduced number of components as compared with the known machines and because of its special arrangement for the copy sheet holder is of small size and thus requires little space for its installation.

These objects are achieved in accordance with the present invention in that the carriage is uncoupled from the chain at its end positions, and in that the chain which continues to circulate is provided with means which actuate other controls, particularly during the time that the carriage is uncoupled.

In this way, the drive motor for the carriage is also used to control and to drive feed means for the copy sheet material, with the result that synchronization is achieved between the movement of the carriage and the movement of the copy sheet material in a particularly favourable way. Further, it also means that control functions can be performed with the carriage uncoupled, and the drive motor can be comparatively small because it drives the carriage and said other controls alternately.

Preferably, there is provided on the carriage a slide block in which a vertically slotted guide is reciprocably movable parallel to the carriage, the guide being interlocked with a pin carried by the endless chain, and the slot in the guide being of a length at least equal to the distance between two main lengths of the chain. Releasable coupling means are provided in the slide block which effect a rigid locking of the slotted guide in the slide block in each of the two directions of movement thereof. In this way the engagement between the chain and the slotted guide is always maintained intact.

The coupling means are preferably formed simply as levers which are pivotable against spring force. Striker elements are preferably provided on a support panel of the machine in the vicinity of the areas where the chain reverses its direction of movement, these striker elements being arranged to lift the levers from their engagement with the slotted guide. This is particularly advantageous because the couplings co-operate with projections on one side only of the slotted guide. Thus, such projections/coupling means may be arranged above and below the slide block and respectively act only in one direction of driving movement.

It is known to provide copying machines with a control shaft provided with control cams and drive members in order to provide a central control for the machine. Such control shafts may be formed as switching rollers.

In accordance with a preferred feature of the present invention there is provided a control shaft fitted with a driving disc with cams which is rotatable through the cams by means of pins provided on the chain. The control shaft is movable when the carriage is stationary and uncoupled, and this is particularly advantageous.

According to another preferred feature of the present invention, the driving disc is arranged coaxially with respect to a driven shaft of one of the sprocket wheels for the chain and the control shaft is preferably guided by this driven shaft which is formed as a hollow shaft. A drive motor can then be directly flanged on to the driven hollow shaft.

Preferably, the driving disc has two cams displaced relative to one another by about 120° and which project into the path of movement of pick-up pins arranged at suitable distances apart on the chain. One of these pick-up pins is preferably the pin which engages with the slotted guide. In this way it is possible to control a revolution of the control shaft by entrainment of the driving disc through 360°, this being of advantage in order to be able to move the control means back into a predetermined initial position after each cycle.

According to a preferred feature of the invention only one driving motor is provided for the movable parts of the machine and the guide path for the copy sheets is so defined in relation to the movement of the carriage that a copy sheet traverses the whole of the guide path for the copy sheet material during one back and forth movement of the carriage.

The driving motor is preferably triggered by a copying master switch which drives and/or switches on the chain, the copy sheet withdrawal roller by way of the control shaft, an element determining the input of the copy sheet material, a multiple copy mechanism, and also a supplementary toner device. In this way one achieves a particularly favourable construction, especially in relation to the synchronized drive of the original and of the copy sheet material.

It is preferable if in the path of movement of the carriage there is provided an abutment which co-operates with an actuating member of the copying master switch and which is in locked engagement with the multiple copy mechanism in such a manner that this abutment causes the opening of the copying master switch when the multiple copy mechanism is in its initial position.

According to a further preferred feature of the invention the aforementioned abutment is arranged on a trip lever which is subject to a spring force and which is in engagement with the multiple copy, mechanism and which in its initial position is movable away from the locking position for the actuating lever of the copying master switch. Upon this release, a continuous back and forth movement of the carriage is controlled by a particularly simple means when multiple copies are to be made from a single original.

The accurate entry of the copy sheet material into its guide path may be achieved without the use of involved control means by providing a movable trip member positioned in front of the feed means in the guide path for the copy sheet material, the trip member acting to hold back the leading edge of the copy sheet from entry into the feed means of the guide path until the original and its carriage have reached a predetermined position.

By this means it is possible that the copy sheet material is substantially wholly fed through into the guide path with only the leading edge of the sheet held back in front of the continuously driven feed rollers until a particular point in time, with the result that the sheet may take up an attitude in which it has a slight degree of curvature.

Because of this there is preferably provided in the machine of the present invention a pivotable blade which is positioned subsequent to the copy sheet stack holder and a withdrawal roller and in the guide path of the copy sheet material in advance of a pair of driven feed rollers. The pivotable blade is movable by the control shaft to a position in front of the nip of the rollers of the feed roller pair for the feeding of a copy sheet towards the nip and in dependence upon a predetermined position of the chain is movable away from the nip in order to free the leading edge of the copy sheet for movement into the nip of the rollers. In order to achieve very precise control this blade must be located as far as is possible immediately at the nip of the rollers. For this purpose the rollers of the feed roller pair preferably comprise disc-type sections and the blade has cutaway portions which match and fit the positions of the disc-type roller sections.

A short structural length of the machine is achieved in that the copy sheet stack holder is arranged vertically as an extension of a vertical leg of the guide path for the copy sheet material and is arranged to be fitted into a receiving pocket at one side of which is positioned the copy sheet withdrawal roller and at the other side of which are arranged extensible support and counterpressure means for the copy sheets in the stack holder.

In order to simplify the insertion of a new stack of copy sheets a cassette is used. The easy insertion of this without any displacement of the free lower edges of the stack may be achieved by the support and counterpressure means including at least one counterpressure roller mounted in the pocket on a slotted guide movable in the direction towards the copy sheet withdrawal roller and also under a spring loading, the counterpressure roller being mounted on a support having a cam-type projection extending into the path of movement of a restoring star member which is connected to a spring-loaded setting lever by means of a unidirectional coupling, the setting lever projecting over the cassette-receiving pocket in its free position and upon actuation by a cassette being inserted into the pocket actuating the restoring star member by means of the coupling so that the star member releases the cam-type projection when the cassette is fully inserted.

Preferably, the restoring star member, which has pick-up projections extending therefrom parallel to its axis of rotation, is mounted on a setting shaft, to which the setting lever is secured, for rotation in only one direction, and additional means may be provided in order to prevent a restoring movement of the star member relative to fixed components of the machine.

BRIEF DESCRIPTION OF THE DRAWINGS

Two embodiments of copying machine in accordance with the invention are illustrated in the accompanying drawings and are described in detail hereinafter. In the drawings:

FIG. 9 is a side view in section taken along the line IX—IX of FIG. 6 to show the control of the copying master switch and its interlocking with a multi-copy mechanism;

FIG. 10 is a detail view on an enlarged scale of a part of the machine shown in FIG. 1 to illustrate the counterpressure roller and is a section taken along the line X—X of FIG. 11;

FIG. 11 is a partial side view of FIG. 10;

FIG. 12 is a sectional view taken along the line XII—XII of FIG. 11, but only showing those parts necessary for an understanding of this part of the machine;

FIG. 14 is a side view, similar to that of FIG. 1, of a copying machine which differs slightly from that of FIG. 1, and showing particularly the arrangement and function of a cassette for holding a stack of copy sheets; and, FIG. 15 is an electrical control circuit for the machine illustrated in FIG. 14.

DESCRIPTION OF THE PREFERRED EMBODIMENTS

Figure 1:
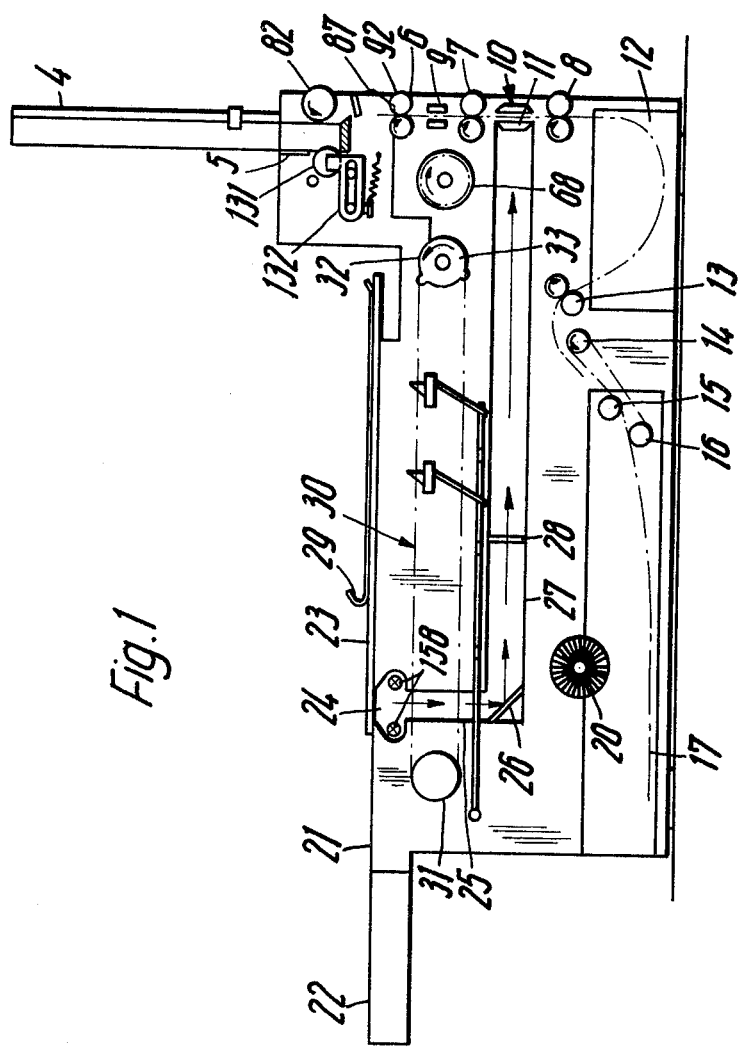
FIG. 1 is a schematic side view of a first embodiment of copying machine in which the more important functional parts of the machine are shown schematically.

In the various Figures of the drawings the same or equivalent elements are indicated by the same reference numerals, although with reference to the embodiment shown in FIGS. 1 to 13 on the one hand and the embodiment shown in FIGS. 14 and 15 on the other hand there are certain differences.

The basic construction of the copying machines is shown schematically in FIGS. 1 to 4 and 14.

The machine has a casing which is indicated at 160 in FIG. 14. Within the casing 160 are arranged two lateral support panels 1 and 2 and a base plate 3. The machine casing 160 has an upper side 21.

Between the lateral support panels 1 and 2 between which or upon which the rest of the working parts are fixed or mounted, insofar as they are not arranged on the base plate 3, is fitted a cassette 4 which is set in an upright position and which is partially received in a pocket 5. Adjacent to this cassette 4 and in the guide path for the copy sheet material are provided permanently driven pairs of feed rollers 6, 7 and 8. Between the pairs of feed rollers 6 and 7 there is arranged a conventional copy sheet charging device 9 with discharge wires, and between the pairs of feed rollers 7 and 8 there is arranged an exposure aperture 10 with an exposure plate 11. The reference numeral 161 in FIG. 14 indicates a plate-like counterpressure or guide means. Below the pair of feed rollers 8 is located a developing unit 12 in which the previously vertical copy sheet guide path changes direction; the subsequent substantially horizontal leg of the guide path includes a permanently driven pair of squeeze and feed rollers 13 and further transport rollers 14, 15 and 16, by means of which a copy sheet is transported to a delivery area 17. This delivery area 17 is accessible from the side of the machine at which the operator stands, as can be seen best from FIG. 3. In the region of the delivery area 17 the lateral support panel 2 is provided with an aperture 18. Furthermore, an end panel 19 (FIGS. 3 and 14) of the copying machine is open in front of the delivery area 17 so that the copy sheet can be withdrawn.

A drying fan 20 is provided inside the machine in the region of the delivery area 17 and is directed towards the copy sheets as they arrive at the delivery area.

Rails 22 are provided at the upper side 21 of the machine and as shown extend out beyond the actual machine casing. A carriage 23 which is arranged to receive a document original is guided on the rails 22 for back and forth reciprocating movement as indicated by the arrow 181. The carriage 23 is movable back and forth over a scanning aperture 24 in the upper side 21 of the machine casing. Below this scanning aperture 24, which may be covered by a transparent material, extends a vertical section 25 of a light tunnel of the scanning mechanism. At the bottom of this vertical section 25 there is provided a reflector 26 which turns the image through 90° and along a horizontal section 27 of the tunnel. The light tunnel terminates at the exposure aperture 10. Optical means 28 may be provided in the horizontal section of light tunnel. Scanning light sources 158 are provided at each side of and below the scanning aperture 24.

In the usual way, the carriage 23 may comprise a frame guided on the rails 22 and incorporating a transparent plate on which a document original is laid. A hingeable cover 29 is secured to the carriage 23 and provides a top cover for an original laid on the transparent plate. Such covers are well-known.

Figure 5:
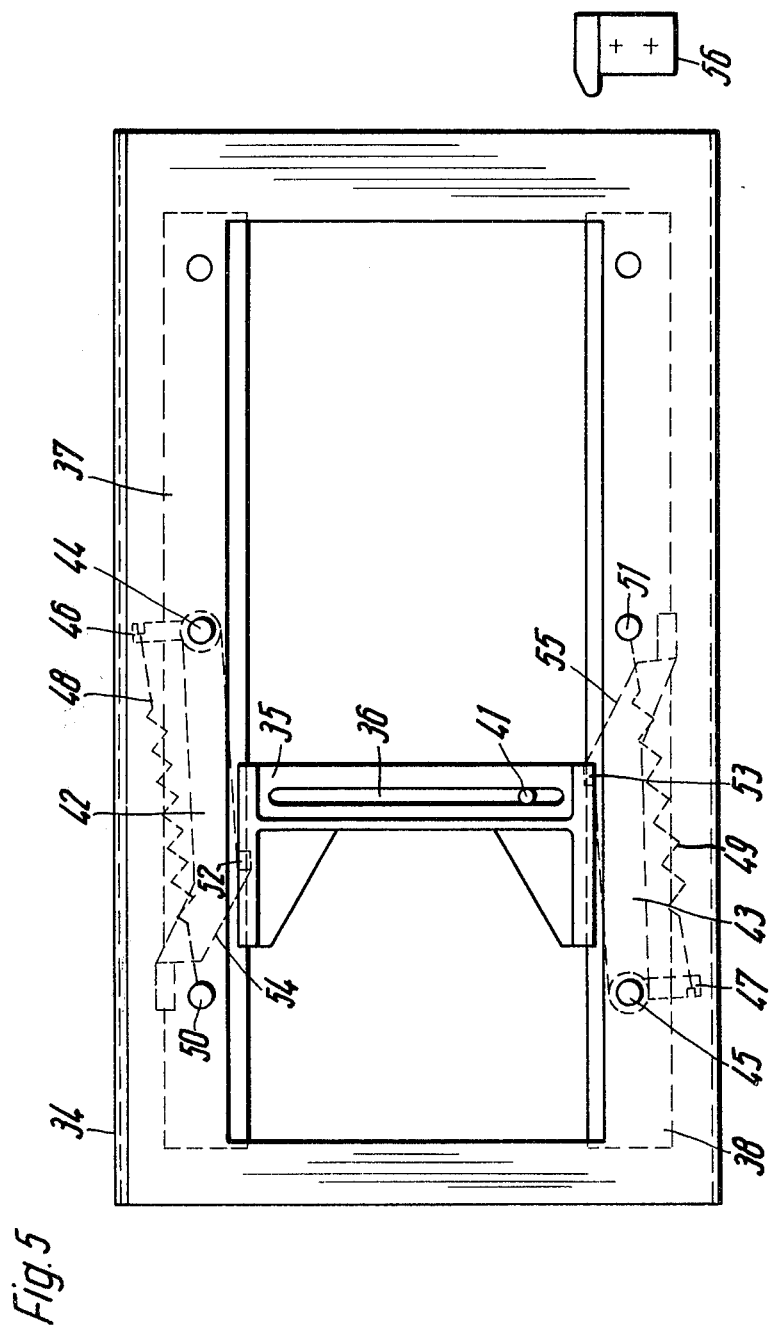
FIG. 5 is an illustration on an enlarged scale of a drive element, and partly illustrating the connection between the carriage for the document original and the drive chain.

The carriage 23 is driven by an endless chain 30 which runs around two sprocket wheels 31 and 32. The sprocket wheel 32 has a driving disc 33 mounted coaxially therewith, the driving disc being shown on an enlarged scale in FIG. 8. The carriage drive is best understood from a consideration of FIGS. 2, 5 and 8. A slide block 34 which is shown enlarged in FIG. 5 is provided on the carriage 23 outside the lateral support panel 1 and extending down at the side of it. A slotted guide 35 having a vertical slot 36 is mounted in the slide block 34 for reciprocating movement on runners 37 and 38 which extend in the longitudinal direction of the machine. The slot 36 has a length which corresponds at least to the distance between the two horizontal sections 39 and 40 of the chain 30. A pin 41 carried by and projecting from the chain 30 is permanently engaged in the slot 36. As the chain 30 moves around the sprocket wheels 31 and 32 so this pin 41 entrains the slotted guide 35 to traverse it over the whole longitudinal extent of the chain 30.

Figure 2:
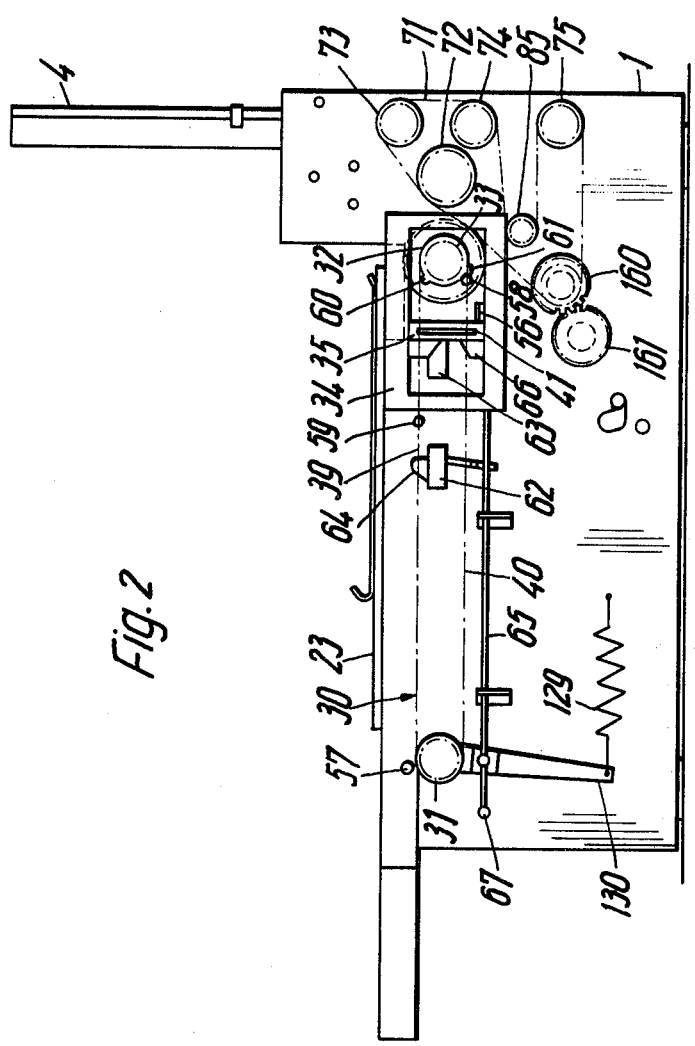
FIG. 2 is a side view of the copying machine, similar to the view of FIG. 1, but in which in order to show the drive means more clearly the view is taken from externally of one side support panel adjacent to the parts involved in the copying process.

Reference is now made to FIGS. 14 and 15. Above the pair of feed rollers 7 there is positioned a charging device 9 above which is arranged a mechanism indicated generally at 162 comprising copy sheet withdrawal roller means and transport means for feeding copy sheets to the charging device. These components are mounted in a housing extension 164 projecting up above the upper surface of the machine casing. The front end walls 165 of the extension 164 remote from the upper side 21 of the machine casing extends to form a top face 166 of the extension. In this casing extension 164 there is provided a recess 167 which is accessible from the top through an aperture 5. The recess 167 is closed at its sides and extends down as far as a copy sheet withdrawal roller 82 which is arranged to be driven and which is mounted within the casing. This copy sheet withdrawal roller 82 projects into the recess 167 so that it presses against the uppermost sheet of a stack 168 of copy sheets in a cassette-type copy sheet stack holder 4 which can be fitted into the recess 167. The wall 169 of the stack holder 4 which is at the side facing the copy sheet withdrawal roller 82 has a hole at its end opposite the roller. This hole is indicated at 170 and is provided so that the roller 82 can press directly against the copy sheet material which is within the cassette-type stack holder 4. The wall 171 on the other side of the stack holder is provided at this same lower end either with holes or with a section 172 of wall which can be pivoted about a hinge and through which or against which, upon the introduction of the cassette-type stack holder, compression springs 173 act respectively in order to press the copy sheets in the holder towards the withdrawal roller 82. The copy sheet withdrawal and feed means includes in the illustrated embodiment a pair of rollers 6 which consist of a driven roller 174 and a co-operating roller 175 having a flat area on its peripheral surface and which is also illustrated in FIG. 2. Such a roller pair is described for example in British Patent Specification No. 1 229 323 and in U.S. Pat. No. 3 552 849. A spring 102 acts upon the roller 175 having the flat surface area. Moreover, this roller 175 is provided on an adjacent disc which lies next to the nip between the rollers 174 and 175 and outside an end roller bearing with a locking slot 176. A locking lever 177 engages in the slot 176 and is mounted for pivotal movement at 178. When this locking lever 177 is released, the spring 102 draws the rollers 175 in the counterclockwise sense, so that the arcuate portion of the periphery of the roller 175 comes into contact with the driven roller 174 and a copy sheet positioned in the nip is entrained by the rollers.

For control purposes an arm 179 is provided on the lever 177 and actuates a switch 180 which will be referred to again later.

Below the pair of feed rollers 8 is located the entry to the developing unit 12 which includes a curved guide surface 163. A more detailed description of this part of the machine is unnecessary since such developing units are well-known. At the exit side of the development unit there is the further pair of feed rollers 13 through which the copy sheets coming from the developing unit are passed, the copy sheets then moving over guide means 14 and 15 to the delivery area 17. The delivery area 17 can be made accessible through a side wall of the machine which is cut away at the appropriate position, or may be accessible through the end wall 19 of the machine, in order to be able to take out the finished copies.

As in FIG. 1, rails 22 are provided on the upper side 21 of the machine casing for guidance of the carriage 23 back and forth in the direction of the double-headed arrow 181. As drive means for the carriage 23 there is provided, for example, a chain drive guided over two sprocket wheels 31 and 32, the chain being provided with a pin 58 which moves in a vertical slot 36 in a slotted guide 35. The slot 36 is of such a length that the pin 58 remains in the slot as it traverses along the length of the upper and lower sections of the chain. This guidance arrangement is shown only by way of example. The construction and arrangement of the slotted guide 35 is also only shown in simplified form in FIG. 14. For example, the slotted guide 35 is shown immediately adjacent to the carriage 23.

This chain drive with the sprocket wheels 31 and 32 is preferably positioned alongside the horizontal section 27 of the light tunnel carrying the scanned image to the exposure aperture.

The basic operation of the cassette and of the associated components is now described with reference to FIG. 15. A main electrical circuit 182 which incorporates the fan 20 is arranged to be switched into operation by means of a main switch 159. By means of this main switch 159 the copying machine is brought to an operational ready state.

The copy sheet withdrawal roller 82 is associated with a control disc 183 (FIG. 14) with a drive which can be set for a preselected number of revolutions. This drive is shown only schematically in FIG. 14 by the illustration of a motor coupling unit 184, and is switched into operation by a separate switch 185 when a copy is to be produced. Furthermore, a control motor 68 which drives the roller 174, the feed roller pairs 7, 8 and 13 and also the sprocket wheel 32 by means of a chain 71 is also located in the machine. The electrical circuit for this motor 68 is made ready by the main switch 159. It includes two parallel branches 187 and 186, the branch 187 including the above-mentioned switch 180 and the other branch 186 including a switch 123 which is actuated directly by the carriage 23 when the carriage is positioned in its withdrawn end position as shown in FIG. 1. In this position of the carriage the switch 123 is open.

The scanning light source 158 and the copy sheet charging device 9 are also connected into the electrical circuit which includes the two branches 187 and 186.

If, after closing the main switch 159 and placing an original to be copied on the carriage, one wishes to make a copy, the switch 185 is closed by the operator. The copy sheet withdrawal roller 82 then feeds a copy sheet into the nip of the rollers 174 and 175. The leading edge of the copy sheet unlocks the roller 175 by actuating the lever 177, with the result that the switch 180 closes and the motor 68 which controls movement of the carriage 23 is switched into circuit. By this means it is possible to ensure that any irregularities in the withdrawal of the copy sheets due to friction or the like do not adversely affect the operation of the machine since the initiation of the carriage drive only takes place when the leading edge of the copy sheet has reached a predetermined position, i.e. when it strikes the lever 177. By the unlocking of the roller 175 there then exists an accurately defined copy sheet feed on account of the definite drive by means of the roller 174 and the other rollers driven by the chain 71, with the result that the spacings and speeds can be so chosen that the leading edge of the copy sheet enters the exposure aperture 10 when the leading edge of the original to be copied comes above the scanning aperture 24.

Reference will now again be made to the embodiment shown in FIGS. 1 to 13.

One special feature is that the slotted guide 35 can be locked relative to the slide block within the rails 37, 38 in the respective directions of movement by coupling means formed as pivotable levers 42 and 43. These coupling levers each represent in practice a unilaterally acting arrester member. The pivocable levers, of which the one, 42, is arranged above the rails 37 and 38 and the other, 43, is arranged below the rails 37 and 38, are pivotable respectively about pins 44 and 45 on the slide block. The levers have extension pieces 46 and 47 respectively at the ends at which they are pivotably mounted, these extension pieces having springs 48 and 49 secured thereto which are secured at their other ends to fixed pins 50 and 51 on the slide block. Towards their pivotally movable ends the levers 42 and 43 have arresting surfaces 52 and 53 respectively by which the slotted guide 35, which has corresponding abutment surfaces, can be engaged for joint movement of the guide and slide block. The slotted guide 35 is provided with respective upper and lower grooves forming tracks engaged by the rails 37 and 38 with flanges either side of the tracks, and the abutment surfaces of the slotted guide are preferably formed by lateral projections jutting out behind the rails 37 and 38 as they are viewed in FIG. 5.

The pivotally movable ends of the levers 42, 43 each have an inclined running surface 54, 55 set at an acute angle to the direction of movement of the slotted guide. When, for example, the carriage 23 is moved into the position shown in FIG. 2, a suitably shaped uncoupling key 56 (FIGS. 2 and 5) strikes against the running surface 55 and lifts the pivotable lever 43 out of its position of engagement with the slotted guide. In this way, the slide block 34 then remains stationary while the slotted guide 35 can be entrained for further movement by the pin 41 as it travels around the sprocket wheel 32.

A corresponding peg-shaped key or abutment 57 (FIG. 2) is provided above the sprocket wheel 31 to strike against the running surface 54 so that at this end position of the slide block, and of the carriage, an uncoupling occurs by pivotal movement of the lever 42 against the force of the spring 48.

Two further pins 58 and 59 are also arranged on the chain 30 besides the above-mentioned pin 41. The pin 58, which may be shorter than the pin 41, projects towards the same side as the pin 41 and extends out sufficiently far to strike the disc 33 so that it can come into engagement with cams 60 and 61 on the disc 33. The pin 59 projects outwardly on the other side of the chain 30 and serves to actuate two switches 62 and 63 whose actuating elements, of which one is shown at 64, project into the path of movement of the pin 59. These switches 62 and 63 serve to switch into circuit the copy sheet charging device 9 (by switch 63) and the scanning light source 158 (by switch 62). Switching of these components out of circuit is effected by an abutment on the slotted guide 35 and by means of a rod 65 which projects as far as the extreme position of movement of the slotted guide 35 at the sprocket wheel 31. The abutment on the slotted guide is indicated at 66 and engages an arcuate end piece 67 of the rod 65, the rod being directly linked to the switches 62 and 63.

Figure 6:
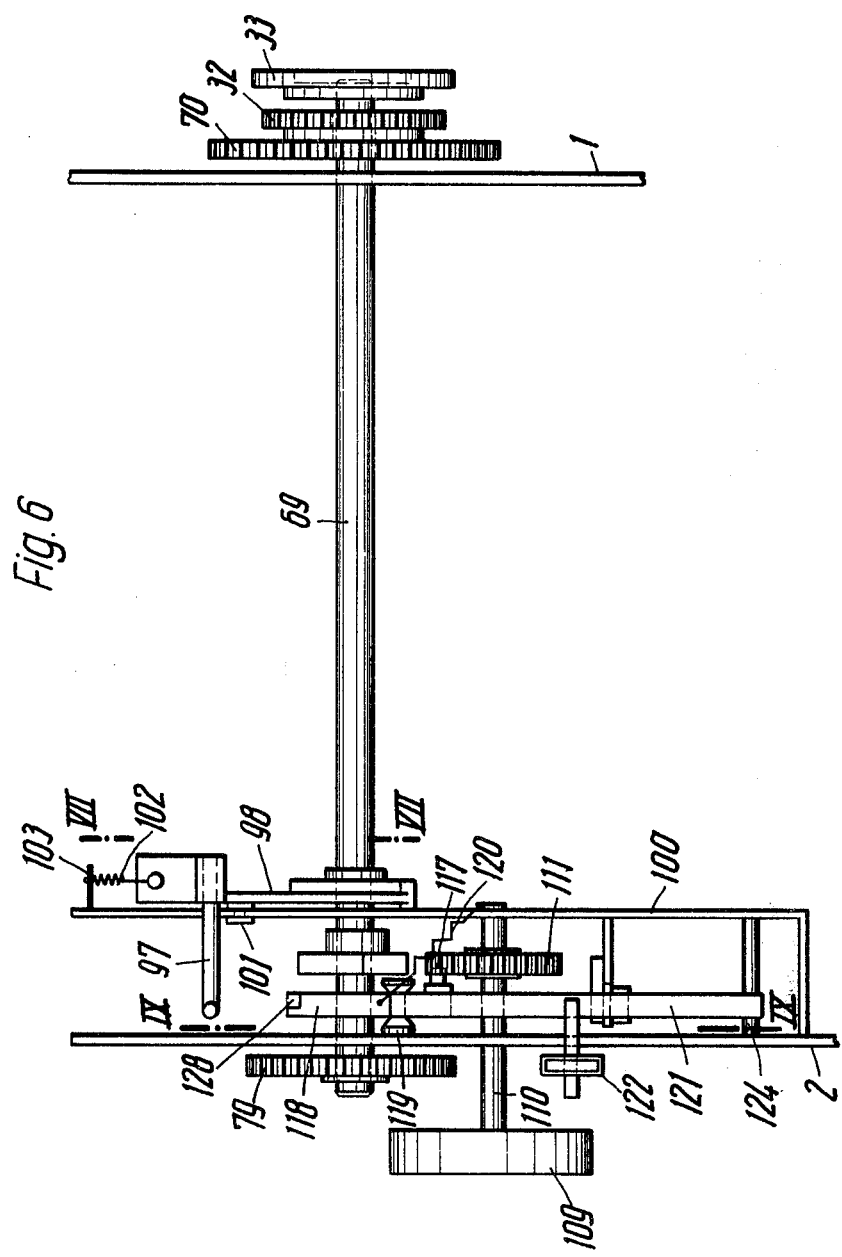
FIG. 6 is a plan view of part of FIG. 1 with the carriage and top panel removed to illustrate more clearly the control shaft arrangement.

In FIG. 6 is shown the driving disc 33 as well as a shaft 69 on which it is mounted and which acts as a control shaft. This shaft 69 is guided for free rotational movement through an assembly of two wheels comprising the sprocket wheel 32 and a gear wheel 70 connected to the sprocket wheel 32 for fixed rotation therewith.

In FIG. 2 can be seen a drive chain 71 which is driven from a gear wheel 72 with which is associated, inside the support panels 1 and 2, the drive motor 68 (FIG. 1). This drive chain 71 drives one roller of each of the roller pairs 6, 7 and 8 through respective gear wheels 73, 74 and 75. Between the driven rollers (not shown in FIG. 4) and the rollers of these roller pairs which are visible in FIG. 4 gear connections are provided, one gear wheel 76, 77, 78 of each connection being visible in FIG. 4. Furthermore, by means of the drive chain 71, the feed roller 13 is driven by means of a chain-gearwheel combination 76, and the feed roller 14 is driven by means of a gearwheel 161. Subsequent transport rollers such as 16 are connected by a transmission linkage with others of the rollers which are rotated in the same sense.

It will thus be appreciated that the copying machine functions with only one drive motor, for which the prerequisite is a compressed copy sheet guide path which includes only one change of direction, with additionally the control movements being effected by this drive motor, admittedly with the carriage stationary.

Figure 7:
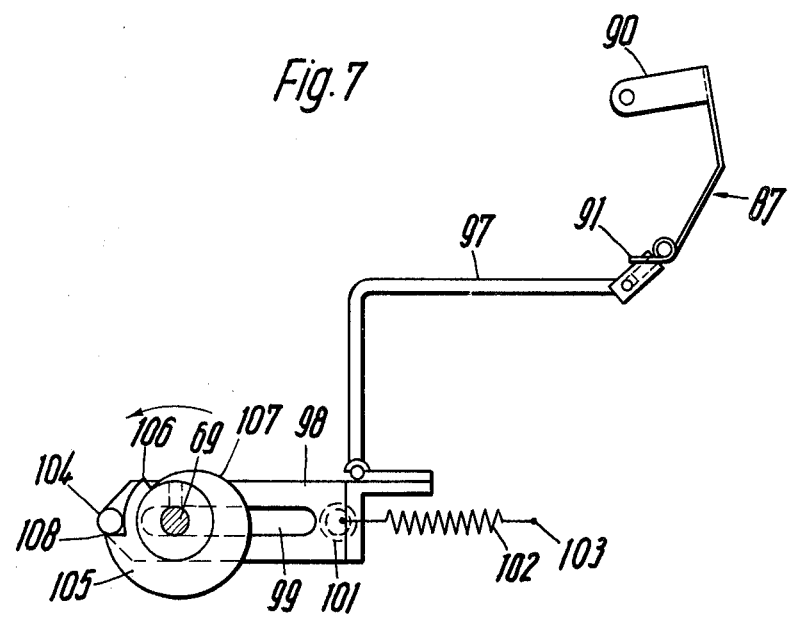
FIG. 7 is a sectional view taken along the line VII—VII of FIG. 6 showing on an enlarged scale the controlled part, i.e. an arresting element for copy sheet material which is illustrated also in FIG. 4.
Figure 8:
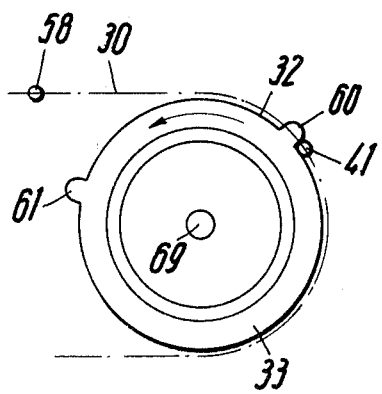
FIG. 8 is a view of a part of the machine as shown in FIG. 2 on an enlarged scale.

Reference is now made to FIG. 6 and to the associated FIGS. 7 to 9. The control shaft 69 extends through the two side support panels 1 and 2. The control shaft is driven by the driving disc 33 by means of the cams 60 and 61 on the disc which are entrained by the pins 58 and 41 on the chain 30. FIG. 2 shows the instant when the slotted guide 35 is uncoupled from the slide block. At this moment the pin 58 strikes against the cam 61 and entrains it through 240°. After just 120° of this rotation the cam 60 arrives at the lower section of the chain 30 and at a point in time at which the pin 41 arrives at the driving disc 33. This pin 41 then entrains the cam 60 until it reaches its initial position as shown in FIG. 2. An intermediate position is shown in FIG. 8, which also shows the position of the control shaft 69 in this intermediate position.

FIG. 2 shows the carriage 23 in its initial position. From this it follows that before a movement of the carriage, i.e. before the slotted guide 35 arrives at the position shown in FIG. 5 to pick up the slide block 34 through engagement by the pivotable lever 42, the control shaft 69 undergoes a rotation.

Figure 3:
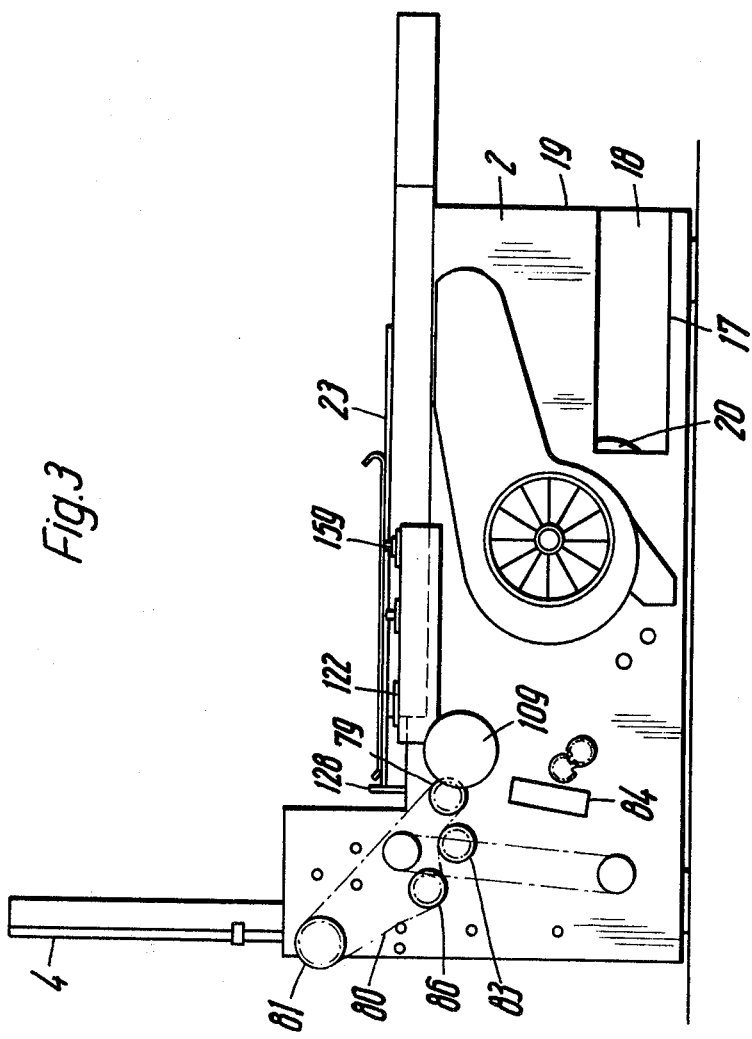
FIG. 3 is a side view from the other side of the copying machine, i.e. the machine operator's side, and looking towards the other side support panel which is at the other side of the parts involved in the copying progress.

At its end externally of the side support panel 2 the control shaft 69 carries a gearwheel 79 fixed for rotation therewith. This gearwheel 79, which is also shown in FIG. 3, drives a second drive chain 80. This drive chain 80 is guided over a gearwheel 81 on the shaft of the copy sheet withdrawal roller 82 (FIGS. 1 and 4) as well as over a gearwheel 83 which in a manner synchronised with the working cycle drives an adjustable supplementary developing device which is shown only schematically at 84.

Idler wheels 85 and 86 are provided in the track of the two drive chains 71 and 80.

Figure 4:
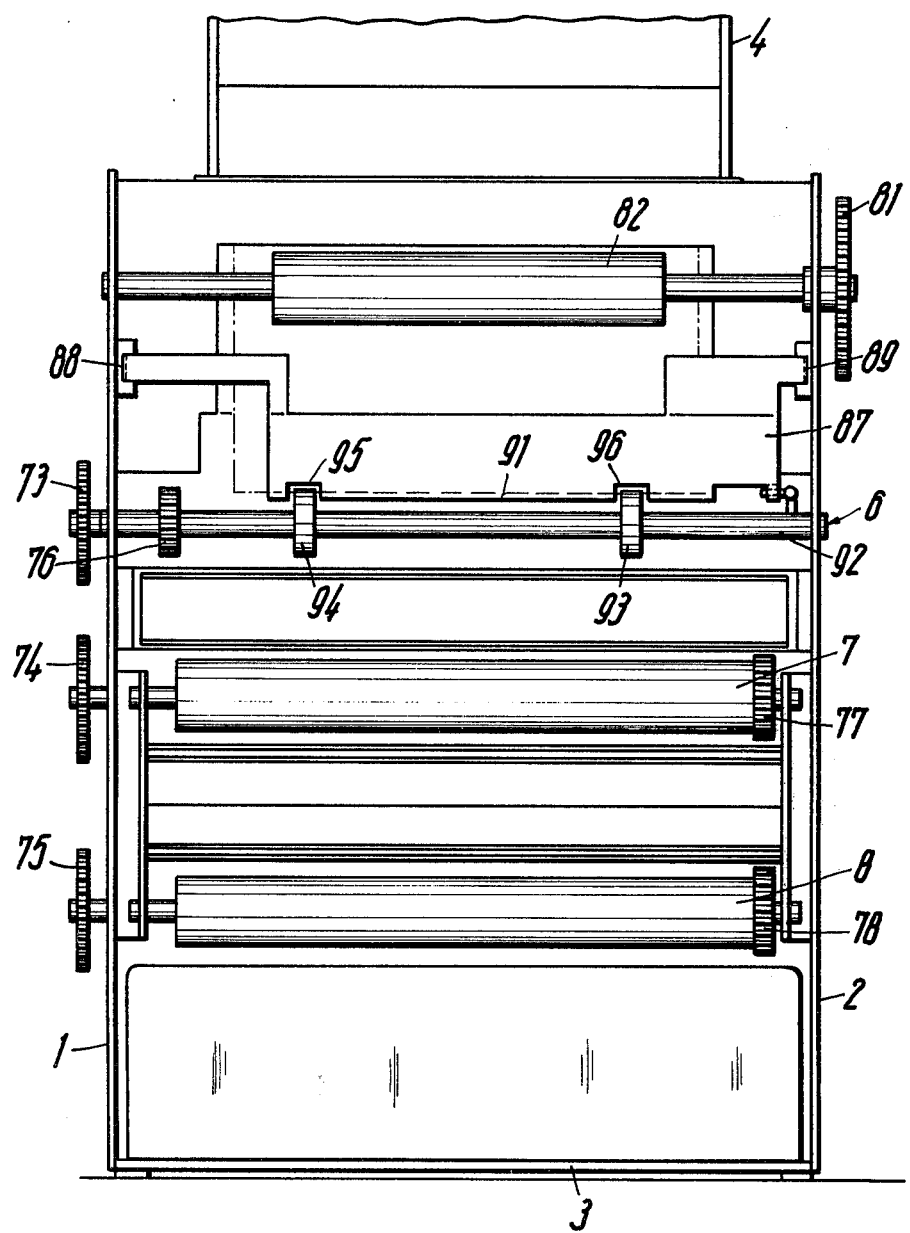
FIG. 4 is a view of the machine when open, and as viewed from the right-hand side of FIG. 1.

Consequently, with the rotation of the control shaft 69 before the movement of the carriage 23, the copy sheet withdrawal roller 82 has fed a sheet of copy paper from the stack 4 into the guide path in the direction towards the feed roller pair 6. In the guide path in advance of the feed roller pair 6 there is provided a pivotable trip blade 87 (FIGS. 1, 4 and 7). This blade 87 is pivotably mounted at 88 and 89 to the side support panels 1 and 2, the pivotal mounting being accomplished by lateral bent projections 90 of the blade which have bearing openings for mounting pins. A lower bent section 91 of the blade is movable exactly over the nip of the rollers of the feed roller pair 6. The rollers of this feed roller pair 6 are, as is shown in FIG. 4, in which the front feed roller 92 is shown, formed as roller discs 93 and 94. The blade 87, and particularly the bent lower section 91 thereof, has recesses 95 and 96 at its lower edge which fit around the roller discs 93 and 94 so that the bent blade section 91 is arranged directly above the nip of the rollers of the roller pair 6 when the blade is pivoted inwardly of the machine. The pivotally suspended blade 87 is connected to a slide 98 by means of a rod 97 and pivotable intermediate members, and the slide 98 is provided with a slot 99 which receives the control shaft 69. The slide is mounted without the capacity for pivotal movement in the direction shown in FIG. 7 on an intermediate support panel 100 by means of a pin 101. The slide 98 is acted upon by a spring 102 which at its other end at 103 is secured to the intermediate support panel 100. A cam follower 104 is provided on the slide 98 in the form of a pin extending perpendicular to the slide, the cam follower 104 co-operating with a cam 105 which is secured for rotational movement on the control shaft 69 and which has a spiral profile over a considerable proportion of its circumference.

In the initial position, in which the cam 60 is in the position shown in FIG. 2, the cam follower 104 rests in a notch 106 of the cam 105. From this notch 106 the cam surface 107 spirals outwardly towards a notch 108 at which, when the follower 104 drops into it, the spring 102 is able to pull the slide 98 to the right as viewed in FIG. 7.

The notch 106 serves additionally for resilient locking of the control shaft 69 in a defined initial position. Upon driving of the control shaft 69 in the manner described above the cam surface 107 moves the slide 98 to the left, as viewed in FIG. 7, with the result that the bent lower section 91 of the blade 87 is brought in front of the nip of the roller pair 6. Simultaneously, the copy sheet withdrawal roller 82 which performs a number of revolutions dependent upon the transmission between the sprocket wheels 79 and 81, feeds a copy sheet to the bent lower section 91 of the blade 87. When the notch 108 reaches the cam follower 104 and the slide 98 is moved rapidly to the right under the force of the spring 102 and opens up the entry into the feed roller pair 6, and because of the rapidity and direction of this pivotal movement the leading edge of the copy sheet moves into the nip of the pair of feed rollers 6.

From a comparison of FIGS. 7 and 8, it will be apparent that at this point in time the pin 41 located in the slotted guide 35 is then at the sprocket wheel 32, i.e. the carriage 23 remains stationary until this point in time, and indeed remains stationary until the slotted guide 35 reaches the position shown in FIG. 5 in relation to the slide block 34. It can be seen from FIG. 2 that there is a certain space left between the sprocket wheel 32 and the slotted guide 35 when it is located in this position. This space is so dimensioned that the carriage 23 in its movement guides the leading edge of the original over the scanning aperture 24 at exactly the same time as the leading edge of the copy sheet arrives at the exposure aperture 10.

From FIG. 3 it can be seen that in front of the side support panel 2 there is arranged a setting disc 109 which is also shown in FIG. 6. The setting disc 109 consists of a wheel provided with teeth around its periphery and which acts as a setting wheel for a multiple copy mechanism. This multiple copy mechanism is shown in FIG. 6 and also in FIG. 9. A shaft 110 on which the setting disc 109 is mounted in the side support panel 2 and in the intermediate support panel 100 and carries a gearwheel 111 whose teeth correspond to the tooth arrangement on the setting disc 109. This toothing, which is shown in FIG. 9 at 112, is interrupted at one region 113. A cam 114 mounted on the control shaft 69 engages with this toothing 112 and moves the gearwheel 111, upon each revolution of the control shaft 69, by one tooth on the setting disc 109. The break 113 in the toothing 112 is at a position which is associated with the number "1" on the setting disc 109. This number indicates to the operator that only one copy is to be produced, and in this position the cam 114 can rotate without engagement with the teeth 112.

At positions around the toothed wheel 111 which are associated with the teeth there are provided locking depressions 115, 116 . . . in which a locating pin 117 on a trip lever 118 is removably engageable. This trip lever 118 is pivotably mounted on a pivot pin 119 in the support panel 2 and is also mounted in such a way that it is to a certain extent tiltable laterally, which as shown in FIG. 6 is achieved by enlarged side pieces of the pin 119. This trip lever 118 is stressed in one direction by a spring 120 secured at one end to the lever and at the other end to the intermediate support panel 100, in such a manner that the pin 117 is drawn resiliently against the toothed wheel 111 and against the locking depressions 115, 116, etc. By means of the setting disc 109 the toothed wheel 111 can be rotated ratchet-wise relative to the locating pin 117 in order to set a required number of copies to be made from a single original.

The trip lever 118 co-operates with an actuating lever 121 of the copying master switch 122 which is also shown in FIG. 3. The actuating lever 121 also operates a switch 123 in the electrical circuit of the drive motor 68 (see also FIG. 13).

When the actuating lever 121, which is pivotably mounted on a pin 124 on the support panel 2, is depressed in order to actuate the switch 123, an inclined surface 125 thereof which extends inwardly and downwardly at an angle from its upper edge comes into contact with a correspondingly inclined surface 126 on an extension of the trip lever 118, with the result that the trip lever 118 is moved for a short time laterally against the force of the spring 120 as viewed in FIG. 6. The actuating lever 121 is moved downwards until a lug 127 on the trip lever 118 snaps over the upper surface of a lug 127' of the actuating lever, under the action of the spring 120. As a result of the lateral movement due to the co-operation of the inclined surfaces 125 and 126, the trip lever 118, again with reference to FIG. 6, is pivoted to the left so far that an extension stop 128 thereof is moved laterally out of the path of movement of the carriage 23. The spring 120 can pull the extension stop 128 into this position towards the side wall of the carriage so that the extension stop after movement of the carriage from its basic position is then drawn back to the right into the path into the path of movement of the carriage if only one copy is to be made. The carriage 23 breaks the switch 123 after the complete ending of its back and forth movement since the trip lever 118 swings upwardly with reference to FIG. 6.

These conditions apply for the production of the last of a series of copies or for the production of only one copy, in which the position of the gap 113 in the teeth 112 is positioned in front of the switching cam 114. In this position the locating pin 117 lies in a deeper profile than it does with the depressions 115, 116, . . . so that the extension stop 128 can perform the lateral movement into the path of the carriage. If, on the other hand, the setting disc 109 and consequently the toothed wheel 111 are adjusted so that now multiple copies are to be produced from a single original, then the locating pin 117 lies in the flatter depressions 115, 116, . . . against the force of the spring 120 in such a laterally pivoted position that the extension stop 128 is not reached by the carriage 23, so that the switch 123 remains closed to initiate a new working cycle in the manner described above, since the carriage travels past the extension stop 128.

Thus, the functioning of the machine has been described above at the same time as the description of its construction. With reference to FIG. 2 it is pointed out that the sprocket wheel 31 is formed as an idler wheel and is arranged on a pivotable lever 130 which has a force exerted thereon by a spring 129.

The advantages of the uncoupling of the carriage in its initial position will now be explained, particularly with reference to FIG. 2. Correspondingly, the movement of the chain 30 could also be utilized for the uncoupling at the other end of the stroke of the carriage. In the embodiment described above, the short-term standstill of the carriage at the said other end of its stroke has the advantage that the carriage remains with its one edge above the scanning aperture until the scanning light source is switched off and thus covers the scanning aperture so that the operator is not troubled by light emitted from the machine. It can be seen from FIG. 1 that the cassette 4 is inserted into the pocket 5 with a stack of copy sheets therein. The cassette is open at its front wall facing towards the withdrawal roller 82 and also similarly at its rear wall where at least one, and preferably two, counterpressure rollers 131 press against the leading or lower part of the stack in order to press a sheet against the withdrawal roller 82. The rollers 131 are mounted on respective slides 132 which are each movable parallel to a slot 133 therein on two rods 134 and 135, and in a direction perpendicular to the direction of insertion of the cassette 4. A spring 136 is secured at one end to each slide 132 and at the other end is secured by fastening means to a support panel, the spring 136 being such that it endeavours to pull the roller 131 into the pocket 5 for the cassette.

Above the two rods 134 and 135 there is a further rod 137 extending between the side support panels 1 and 2. A hollow shaft 138 is rotatably mounted on this further rod 137 and a setting lever 139 is secured at about the centre of the hollow shaft 138 for fixed rotation therewith. The setting lever 139 projects into the cassette pocket 5 in its free position so that it can be pressed downwardly by the insertion of a cassette. The hollow shaft 138 is of square shape at its two ends 140 in the immediate vicinity of the slides 132. At each shaft end one half 141 of a unidirectional wedge clutch is mounted on the square end 140 so as to be axially movable but not rotatably movable relative to the shaft. The other half 142 of the clutch carries a restoring star member 143 which has pick-up pegs 144, 145, 146 and 147 on its respective star arms and extending parallel to its axis of rotation. The clutch half 142 is rotatable in one direction about the rod 137. It carries on its hub, at its left-hand side as viewed in FIG. 11, a projection with four gradually sloping teeth which fall away steeply on the toothed side in the counter-clockwise sense. Two of these teeth are shown in FIG. 10 at 148 and 149. A resilient locating pin 150 engages in the teeth and is secured to a ring 151 arranged for fixed rotation with the rod 137. This locating pin 150 prevents a rotation of the restoring star member 143 in counter-clockwise sense with reference to FIG. 10. The only possible direction of rotation is that indicated by the arrow 152.

The two halves 141 and 142 of the clutch are urged together resiliently by a spring 153 which is seated at one end on the setting lever 139 and the other end on the axially displaceable half 141 of the clutch.

At the other side of the setting lever 139 there is provided a corresponding spring 154 for the other counterpressure roller 131.

A lug 155 is provided on the setting lever 139 to provide a connecting piece for the securement of one end of a tesnion spring 156 which is secured at its other end to the rod 134.

Thus, the arrangement as just described is held in the illustrated basic position with the setting lever 139 directed upwardly at an angle into the cassette pocket 5. A cassette inserted into the pocket forces the setting lever 139 down in the clockwise sense according to FIG. 12. This causes the star members 143 to be rotated in the direction of the arrow 152 and the pick-up pegs 144-147 strike against a raised abutment 157 which is provided on each slide 132. Thus, the slides 132 and consequently also the counterpressure rollers 131 are entrained towards the left with reference to FIG. 10, and the locating pins 150 slide on the inclined surface of the teeth 149 and take up a new rest position behind these teeth. The extent of the movement and the angle of displacement are so determined relative to one another that the abutments 157 are freed by the pick-up pegs 144-147 when the cassette has reached its lowest position. Then, the springs 136 pull the slides 132 to the right with reference to FIG. 10.

If the cassette is changed in order to put in a new supply of copy sheets, the spring 156 pulls the setting lever 139 into its basic position as shown in FIG. 12, its movement being in a counter-clockwise direction. Thus, the hollow shaft 138 and also the half 141 of the clutch are entrained and the clutch half 141 can rotate relative to the other half 142 of the clutch in this restoring movement direction. The necessary axial movement can be performed against the force of the spring 153 on the free section of the square end 140 of the hollow shaft.

Figure 13:
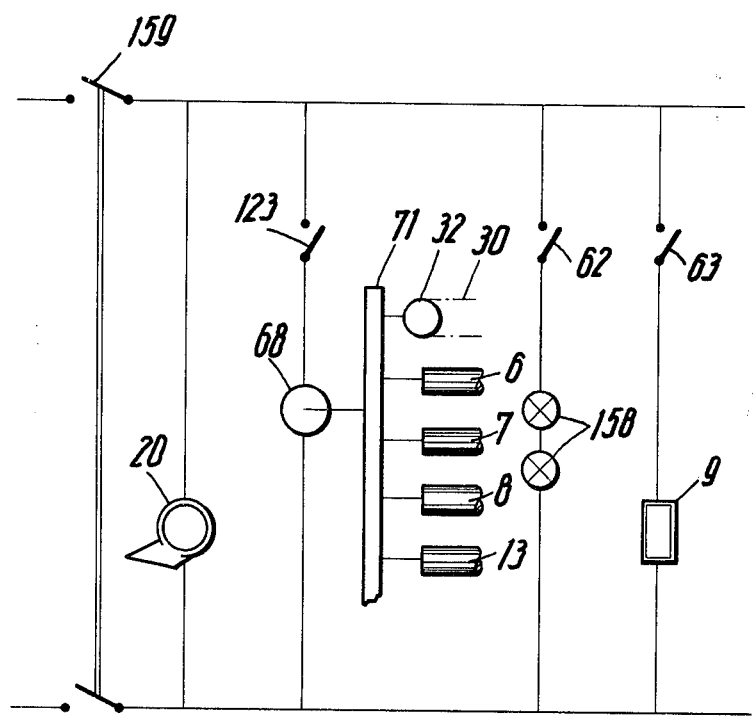
FIG. 13 is a schematic electrical circuit diagram of the copying machine.

FIG. 13 is an electrical circuit diagram showing the main switch 159 which is also shown in FIG. 3 and by means of which the drying fan 20 is directly switched on. The other parts and their functions will be apparent from the preceding description.

We claim:

1. A copying machine for producing one or a number of copies from an original, comprising a casing having an upper surface, a reciprocally movable carriage mounted on the upper surface of said casing and arranged to support an original positioned thereon for movement with said carriage, chain drive means for said carriage including an endless circulating chain, a control shaft and a wheel assembly mounted on said control shaft and in engagement with said circulating chain, said wheel assembly providing rotational movement to said control shaft, a stack holder for copy sheet material with each copy sheet having a leading edge, means forming a guide path for the copy sheets through the casing and said guide path means including feed roller means for feeding individual copy sheets along the guide path, said feed roller means including a first pair of feed rollers forming a nip therebetween for gripping an individual copy sheet and passing it along said guide path, means for removing individual copy sheets from said stack holder and for introducing the copy sheets into the guide path, and a movable trip element positioned in the guide path from said stack holder immediately in front of said first pair of feed rollers, said movable trip element being arranged to hold the leading edge of a copy sheet withdrawn from the stack holder by said means for removing individual copy sheets until the carriage supporting the original has reached a predetermined position said trip element pivotally mounted in said casing for pivotal movement about an axis spaced from and in generally parallel relation with said control shaft, and means operatively connected to said trip element and supported on said control shaft for pivotally displacing said trip element from in front of said first pair of rollers so that the leading edge of a copy sheet can be freed for entry into the nip of said feed roller.

2. A copying machine for producing one or a number of copies from an original, comprising a casing having an upper surface, a reciprocally movable carriage mounted on the upper surface of said casing and arranged to support an original thereon for movement with said carriage, chain drive means for said carriage including an endless circulating chain, a stack holder for copy sheet material with each copy sheet having a leading edge, means forming a guide path for the copy sheets through said casing and said guide path means including feed roller means, means for removing individual copy sheets from said stack holder for introducing the copy sheets into the guide path, a movable trip element positioned in the guide path from said stack holder in advance of said feed roller means, said trip element arranged to hold the leading edge of a copy sheet withdrawn from said stack holder by said means for removing individual copy sheets and to retain the copy sheet from entry into said feed roller means until the carriage supporting the original has reached a predetermined position, said casing includes a vertical extension extending upwardly from its upper surface, said vertical extension forming a receiving pocket therein with an opening thereto in the upper end of said vertical extension, said stack holder is a cassette positioned vertically in said vertical extension and forming an upward extension of the guide path for the copy sheet material, said cassette being insertable into said receiving pocket through the opening in the upper end of said vertical extension, a copy sheet withdrawn roller located within said vertical extension on one side of said receiving pocket, support and counterpressure means located within said vertical extension on the opposite side of said receiving pocket from said copy sheet withdrawal roller and said withdrawal roller and support and counter-pressure means arranged to pressure load the copy sheet material upon insertion of said cassette into said receiving pocket, said support and counter-pressure means comprises at least one spring-loaded counter-pressure roller mounted in said vertical extension adjacent said receiving pocket, a slotted guide positioned within said vertical extension and supporting said counter-pressure roller for movement in the direction toward said copy sheet withdrawal roller, the spring-loaded setting lever positioned within said vertical extension and arranged to extend into said receiving pocket, a unidirectional coupling operatively connected to said setting lever, a restoring wheel connected to said unidirectional coupling for connection to said spring-loaded setting lever, said slide for the counter-pressure roller having a cam-type projection extending into the path of said restoring wheel, said setting lever being arranged in a free position in said receiving pocket and upon actuation by the insertion of a cassette into said pocket said setting lever actuates said restoring wheel by means of said coupling so that the wheel rotates into contact with said cam-type projection on said slide when the cassette is fully inserted and displaces said slide and counter-pressure roller.

3. A copying machine, as claimed in claim 2, in which said restoring wheel has pick-up projections extending therefrom parallel to the axis of rotation of said restoring wheel, a shaft for mounting said restoring wheel for rotation in only one direction, and said shaft having said setting lever secured thereto.

4. A copying machine, as claimed in claim 3, wherein said shaft is a hollow shaft, a rod extending through and rotatably supporting said hollow shaft, said hollow shaft having a polygonal shape at its ends, said shaft carrying one half of said unidirectional coupling at one such end and spring means on said shaft against which said coupling is axially displaceable, the other half of said unidirectional coupling being mounted on said rod and said restoring wheel mounted on said rod to be rotatable therewith, and tooth means on said restoring wheel for locking said restoring wheel against rotation in one direction, and a co-operating resilient ratchet pin mounted on said rod.

5. A copy machine, as claimed in claim 1, wherein said pivotal trip element comprises a blade which is positioned in front of the nip of said first pair of feed rollers and in that position prevents the leading edge of a sheet of copy paper from entering the nip, the rollers of said first pair of feed rollers being formed as laterally spaced disk-type elements, and said blade having recessed portions which fit around said disk-type elements.

6. A copying machine for producing one or a number of copies from an original, comprising a casing having an upper surface, a reciprocally movable carriage mounted on the upper surface of said casing and arranged to support an original positioned thereon for movement with said carriage, chain drive means for said carriage including an endless circulating chain, a stack holder for copy sheet material with each copy sheet having a leading edge, means forming a guide path for the copy sheets through the casing and said guide path means including feed roller means, means for removing individual copy sheets from stack holder for introducing the copy sheets into the guide path, a movable trip element positioned in the guide path from said stack holder in advance of the feed roller means, said movable trip element being arranged to hold the leading edge of a copy sheet withdrawn from the stack holder by said means for removing individual copy sheets until the carriage supporting the original has reached a predetermined position, a vertical extension extending upwardly from the upper surface of said casing, said vertical extension having a receiving pocket therein with an opening thereto in the upper end of said vertical extension, said stack holder is a cassette vertically positionable in said vertical extension and forming an upward extension of the guide path for the copy sheet material within said casing, said cassette being insertable into said receiving pocket, a copy sheet withdrawal roller within said vertical extension located on one side of said receiving pocket for operative engagement with the copy sheet material within said cassette, and support and counterpressure means within said vertical extension located on the other side of said pocket and arranged to provide counterpressure to the stack of sheets within said cassette for forming a pressure-loading on the copy sheet material within said cassette when it is inserted into said receiving pocket.

* * * * *